Patented Apr. 17, 1928.

1,666,482

UNITED STATES PATENT OFFICE.

ERICH BAUM, HANS DEUTSCH, WILLY O. HERRMANN, AND MARTIN MUGDAN, OF MUNICH, GERMANY, ASSIGNORS TO CONSORTIUM FÜR ELEKTROCHEMISCHE INDUSTRIE G. M. B. H., OF MUNICH, BAVARIA.

PRODUCTION OF VINYLACETATE.

No Drawing. Application filed June 15, 1922, Serial No. 568,626, and in Germany June 23, 1921.

Our invention refers to the production of vinylacetate.

It has already been proposed to produce esters and ethers of ethylidenglycol and of vinylalcohol by causing acetylene to react with alcohols and organic acids in the presence of mercury salts with or without the addition of other suitable catalysts. The reaction is carried out by introducing acetylene into the heated acids or alcohols in the presence of mercury salts under rapid stirring, as described in the patent to Klatte No. 1084581. Now we have found that vinylacetate can also be readily produced by conducting acetylene over heated catalysts together with the vapors of acetic acid. Metals, metal oxides and metal salts are particularly effective. We prefer fixing the catalysts upon a carrier such as for instance charcoal, especially charcoal of high absorbing power, pumice-stone, infusorial earth and so on. The catalyst may be also mixed with highly activated carbon and this mixture be fixed on a carrier. Activated carbon as such may also be employed as a catalyst.

*Example.*—A mixture of equal volumes of purified acetylene and acetic acid vapors is conducted thru a tube heated to 200° C. and containing a layer of charcoal impregnated with cadmium acetate. The product of reaction is condensed and vinylacetate, which is the main product of the reaction, can be isolated by fractional distillation.

Cadmium, its oxides and other cadmium salts acts about like cadmium acetate. Instead of cadmium and its compounds other metals and their compounds such as for instance zinc, mercury and magnesium can be used. The temperature of reaction is governed by the nature of the catalysts. The yield of vinylacetate and diacetate is about 80 to 90 percent of the theoretical considering the reacting quantities of acetylene and acetic acid.

Preferably the vinylacetate, which has been formed, can be separated from the acetic acid having a higher boiling point, by fractional condensation, leading back into the still the acetic acid together with fresh acetylene, while the vinylacetate is condensed separately.

The reaction can be carried out at a pressure lower or higher than normal atmospheric pressure.

We wish it to be understood that we do not desire to be limited to the exact substances, temperatures and sequence of operations, except as defined in the claims, for obvious modifications will occur to a person skilled in the art.

We claim:—

1. Process of producing vinylacetate which consists in acting with acetylene and the vapor of acetic acid upon a metal salt at a temperature above the boiling point of said acid.

2. The process of producing vinylacetate which consists in acting with acetylene and the vapor of acetic acid upon a zinc salt at a temperature above the boiling point of said acid.

3. The process of producing vinylacetate which consists in acting with acetylene and the vapor of acetic acid upon a metal salt deposited on a carrier at a temperature above the boiling point of said acid.

4. The process of producing vinylacetate which consists in acting with acetylene and the vapor of acetic acid upon a metal salt deposited on activated carbon at a temperature above the boiling point of said acid.

5. The process of producing vinylacetate which consists in acting with acetylene and the vapor of acetic acid upon a combination of activated carbon and a metal salt at a temperature above the boiling point of said acid.

6. The process of producing vinylacetate which consists in acting with acetylene and the vapor of acetic acid upon a metal salt at a temperature above the boiling point of said acid separated the unaltered substances in a cyclic process from the reaction product, mixing said substance with fresh acetylene and conducting the mixture back to the reaction chamber.

7. The process of producing vinylacetate which consists in acting with acetylene and the vapor of acetic acid upon a metal salt at a temperature above the boiling point of said acid separating the unaltered substances in a cyclic process from the reaction product, mixing said substances with fresh acetylene and conducting the mixture back to the reaction chamber, the reaction being carried thru at a pressure other than normal.

8. The process of producing derivatives of vinylacetate which consists in acting with purified acetylene and the vapor of acetic acid upon a metal salt at a temperature above the boiling point of said acid.

9. The process of producing vinylacetate which consists in acting with equal volumes of purified acetylene and acetic acid vapors at about 200° C. upon zinc acetate and isolating vinylacetate from the condensed product of reaction by fractional distillation.

10. The process of producing vinylacetate which consists in acting with equal volumes of purified acetylene and acetic acid vapors at about 200° C. upon charcoal impregnated with zinc acetate and isolating vinylacetate from the condensed product of reaction by fractional distillation.

In testimony whereof we affix our signatures.

Dr. ERICH BAUM.
Dr. HANS DEUTSCH.
Dr. WILLY O. HERRMANN.
Dr. MARTIN MUGDAN.